Nov. 18, 1947.  R. E. TAMM ET AL  2,431,210
VALVE ASSEMBLY FOR HYDRAULIC BRAKING SYSTEMS
Filed March 5, 1945

INVENTORS
ROBERT E. TAMM
BY  EDWARD R. MARTENS
ATTORNEYS

Patented Nov. 18, 1947

2,431,210

UNITED STATES PATENT OFFICE 2,431,210

VALVE ASSEMBLY FOR HYDRAULIC BRAKING SYSTEMS

Robert E. Tamm, Royal Oak, and Edward R. Martens, Detroit, Mich., assignors to The Warner Aircraft Corporation, Detroit, Mich., a corporation of Michigan Application March 5, 1945, Serial No. 581,126

7 Claims. (Cl. 121—46.5)

This invention relates generally to valve assemblies and refers more particularly to improvements in valve assemblies for hydraulic systems such, for example, as brake systems.

The successful operation of hydraulic brake systems depends to a great extent upon the ability to bleed or remove all of the air and vapor from the system during the interval the system is filled with the specified hydraulic fluid medium. The efficiency of the bleeding operation is especially critical in installations where design considerations require supporting the reservoir and master cylinder unit at a substantially higher elevation than the power valve and/or where the plumbing of the system embodies severe traps.

It is an object of this invention to assure effectively bleeding all of the air and vapor from the system regardless of differences in elevation of the several instrumentalities of the system relative to the power valve and irrespective of any traps that may be present in the plumbing of the system. In accordance with the present invention, provision is made for filling the system through the power valve from a source of fluid under relatively high pressure and for subsequently enabling return flow of the fluid through the power valve into the atmosphere until all of the air and vapor is discharged from the system.

One specific means for accomplishing the above result is described in detail in the following specification and is shown on the accompanying drawing, wherein.

Figures 1, 2, 3, 4:
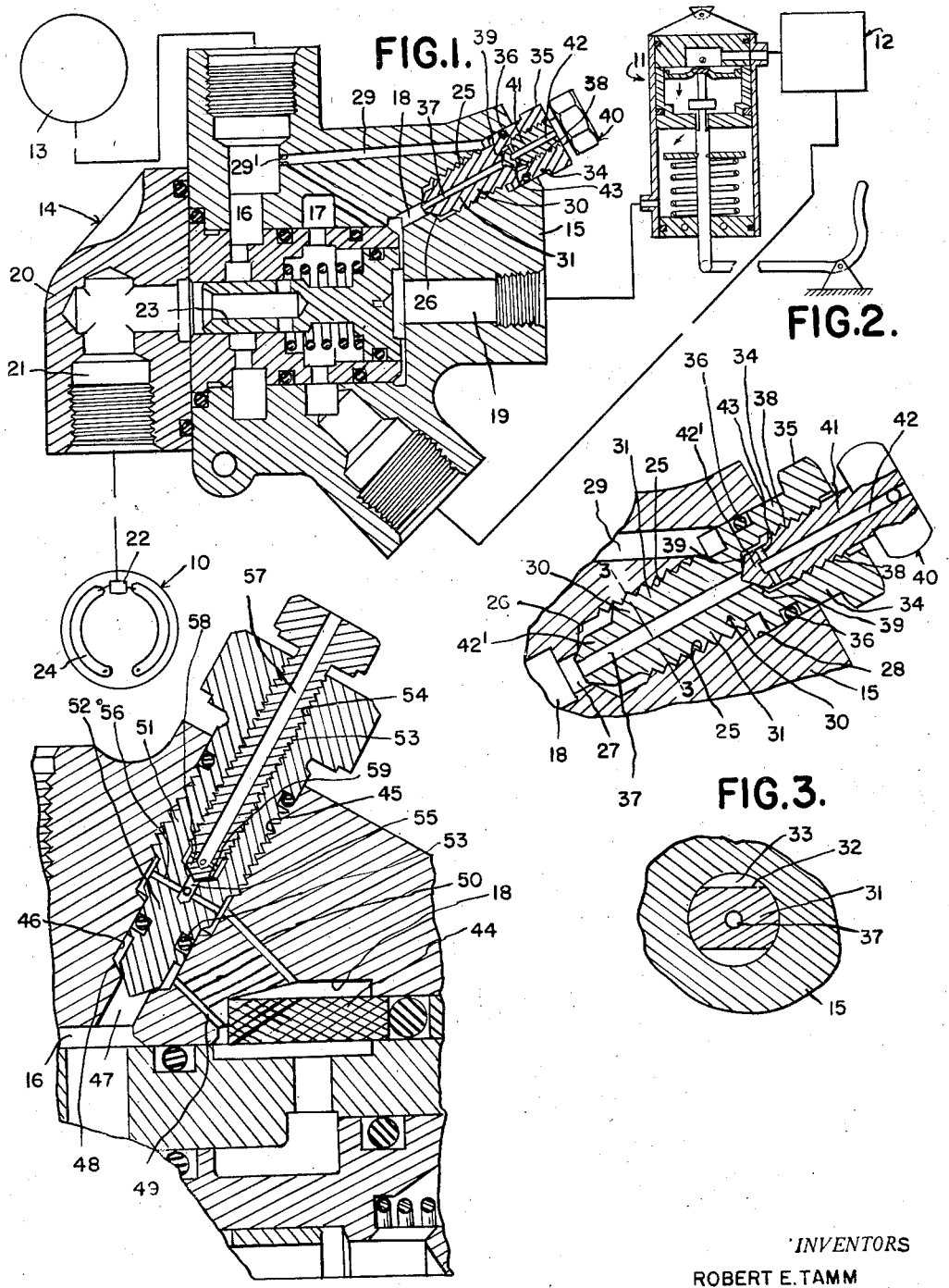
Figure 1 is a longitudinal sectional view through a power valve and diagrammatically showing the several parts of a typical hydraulic brake system.
Figure 2 is an enlarged fragmentary sectional view through a part of the valve shown in Figure 1.
Figure 3 is a cross sectional view taken on the line 3—3 of Figure 2.
Figure 4 is a fragmentary sectional view showing a slightly modified form of construction.

In Figure 1 of the drawing, we have shown a typical hydraulic brake system comprising a brake 10, a master cylinder 11, a reservoir 12 connected to the upper end of the master cylinder, an accumulator 13 adapted to contain a source of fluid under relatively high pressure and a power or control valve 14.

Although the details of construction of the power or control valve may vary in accordance with the particular installation, nevertheless, the one shown herein will serve the purpose of illustrating the present invention. In general, the valve 14 comprises a casing 15 having three chambers designated in Figure 1 of the drawing by the reference characters 16, 17 and 18. The chamber 16 communicates with the accumulator 13 and the chamber 17 communicates with the reservoir 12. The end chamber 18 communicates directly with the lower end of the master cylinder 11 through a passage 19 formed in the casing 15 at one end thereof. The opposite end of the casing is provided with a cap 20 having a port 21 which communicates with the brake actuator 22.

The valve 14 has a piston 23 slidably mounted in the chamber 18 and operated by fluid under pressure admitted to the chamber 18 through the passage 19 to connect the chamber 16 with the port 21. As a result, fluid under relatively high pressure flows from the accumulator to the brake actuator and the friction means 24 of the brake are moved outwardly into engagement with the brake drum. It will further be noted from Figure 1 of the drawing that the piston is provided with opposite end portions of differential area and is positioned in the valve casing with the portion of greatest area exposed to the fluid under pressure from the master cylinder. As a result the relatively low pressure from the master cylinder is sufficient to move the piston to brake applying position. However, when the relatively high pressure acting on the reduced end of the piston exceeds the desired brake applying pressure, the piston is moved to connect the port 21 to the chamber 17 and, since the chamber 17 is connected to the reservoir 12, the pressure at the brake actuator 22 is reduced. The construction is such that the piston floats between the chambers 16 and 17 to maintain the desired brake applying pressure at the actuator 22. It will, of course, be understood that when the master cylinder is released, the pressure acting on the enlarged end of the piston drops and the brake actuator is connected to the reservoir through the chamber 17.

The valve casing 14 is formed with a recess 25 adjacent the upper end thereof and the inner end of the recess 25 is formed with an annular valve seat 26 having a passage 27 therethrough communicating with the chamber 18. The outer end of the recess is provided with an enlarged portion 28 and the latter communicates with the chamber 16 through a passage 29.

The passage 27 in the valve seat 26 is controlled by a valve member 30 having a stem portion 31 threaded in the recess 25 and having the opposite sides of the stem fashioned to form flats 32. These flats cooperate with the adjacent sides of the recess 25 to form passages 33 between the enlarged portion 28 of the recess 25 and the passage 27. The lower end of the stem 31 is reduced and is fashioned to engage the valve seat 26 and the upper end of the stem is provided with an enlargement 34 which engages the side wall of the enlarged portion 28 of the recess 25. The enlarged portion 34 terminates beyond the valve casing 15 in a polygonal portion 35 to enable manipulation of the valve member by a suitable tool, and an O-ring seal 36 is provided to prevent the escape of fluid past the portion 34 of the valve member.

As shown in Figure 2 of the drawing, the valve stem 31 is formed with a passage 37 therethrough. The inner end of the passage registers with the passage 27 in the valve seat 26 and the outer end of the passage communicates with a recess 38 formed in the enlarged portion 34 of the valve member 30. The inner end of the recess 38 surrounding the outer end of the passage 37 is fashioned to form a seat 39 and the flow of fluid through the passage 37 is controlled by a second valve member 40.

The valve member 40 has a stem 41 which threadedly engages the wall of the recess 38 and is provided with a reduced portion 42' at the lower end for engagement with the valve seat 39. The upper end of the valve member 40 projects beyond the corresponding end of the valve member 30 and is polygonal in shape to enable manipulation thereof by a suitable tool. The valve member 40 is also formed with an axial passage 42, which terminates short of the inner end of the valve stem 41 and communicates with the recess 38 through lateral passages 43. The outer end of the passage 42 communicates with the atmosphere in the manner clearly shown in Figure 2 of the drawing.

When it is desired to fill the hydraulic braking system, the valve member 30 is raised from the seat 26 to connect the chambers 16 and 18. As a result, fluid under pressure from the accumulator 13 is discharged into the system through the passage 19. When the system is filled, the valve member 30 is again engaged with the seat 26 to close communication between the chambers 16 and 18 in the power valve, and the bleeder valve 41 is moved off of its seat 39 to open the passage 37 in the valve member 30. Hydraulic fluid medium is then free to flow outwardly through the passages 37 and 42 to the atmosphere. After a certain quantity of hydraulic fluid medium escapes through the bleeder valve 40, the latter is closed and the valve member 30 is again opened to replenish the supply of fluid in the system. The valves 30 and 40 are alternatively operated in the above manner until a steady stream of hydraulic fluid medium is discharged from the bleeder valve 41. This condition indicates that all of the air and vapor is expelled from the system and that further bleeding is not necessary.

It has been stated that when the filler valve 30 is opened, fluid under pressure from the accumulator 13 is by-passed to the chamber 18 in the control valve 14 and is admitted to the control circuit through the port 19. However, since one end of the valve member 23 occupies a position in the chamber 18, it follows that fluid under pressure admitted to the chamber has a tendency to move the valve member 23 to brake applying position. This condition may be avoided during the filling operation by limiting the extent to which the filler valve 30 is opened, so that the rate at which fluid is admitted to the chamber is insufficient to actually move the valve member 23. Such practice depends upon the human element for satisfactory operation and may prove troublesome in some installations. In such installations, it is proposed to provide a restriction 29' in the passage 29 between the chamber 16 and the chamber 18. This restriction is such that it insures admitting fluid under pressure to the chamber 18 at a rate below the rate required for valve operation regardless of the extent of opening of the filler valve 30.

The embodiment of the invention shown in Figure 4 of the drawing illustrates an installation wherein a filter 44 is positioned in the chamber 18 to intercept any foreign matter that may be present in the brake system between the power valve and master cylinder 11. When a filter of the type indicated by the reference character 44 is employed, it is desirable to admit hydraulic fluid medium to the chamber 18 at the inner side of the filter when filling the system and to discharge fluid from the chamber 18 at the outer side of the filter during the bleeding operation.

With the above in view, the reference is made in detail to Figure 4, wherein it will be noted that the power valve casing is provided with an outwardly extending recess 45 having a reduced portion 46 at the inner end communicating directly with the chamber 16 through a passage 47 and having an annular seat 48 surrounding the passage. The reduced portion 46 of the recess communicates with the chamber 18 at the inner side of the filter 44 through a passage 49 and the outer portion of the recess communicates with the chamber 18 at the outer side of the filter 44 through a passage 50. The flow of hydraulic fluid medium from the chamber 16 to the chamber 18 through the passage 49 is controlled by a valve member 51 threaded in the recess 45 and having a reduced inner end portion 52 engageable with the seat 48. An O-ring seal 53 is carried by the reduced portion 52 of the valve member and frictionally engages the inner wall of the reduced portion 46 of the recess. The seal 53 is located between the passages 49 and 50 so as to prevent the escape of hydraulic fluid medium past the reduced portion 52 of the valve member into the passage 50.

The valve member 51 is also provided with an axially extending recess 54 having a reduced portion 55 at the inner end communicating with the passage 50 through radial passages 56. The flow of fluid through the passages 56 is controlled by a second valve 57 threadedly supported in the recess 54 and having a portion 58 at the inner end engageable with a seat 59 surrounding the inner reduced portion 55 of the recess 54.

The operation of the valves shown in Figure 4 of the drawing to fill and bleed the brake system is the same as the operation of the valve illustrated in Figures 1 to 3 inclusive. The principal difference between the two constructions is that the valve arrangement shown in Figure 4 enables by-passing the filter 44 during the filling operation and permits bleeding the system from the outer side of the filter. This arrangement is preferred in cases where a filter is used, because it prevents trapping of air or vapor in the system at the outer side of the filter.

While in describing the present invention particular stress has been placed on the use of the combined filler and bleeder valve assemblies in connection with hydraulic brake systems, it is to be understood that this valve assembly may be used in practically any hydraulic installation embodying a power circuit and a control circuit to fill the latter from the former.

What we claim as our invention is:

1. A control valve for a hydraulic brake system having a source of fluid under pressure, a pressure producing device, a reservoir and a fluid pressure operated brake actuator, said control valve comprising a valve chamber having spaced passages respectively connected to the pressure producing device and brake actuator, first and second chambers spaced from each other longitudinally of the valve chamber between said passages and respectively connected to the source of fluid under pressure and the fluid reservoir, a valve member slidably supported in the valve chamber between said passages and movable in opposite directions to alternately connect the brake actuator to the source of fluid under pressure and to the reservoir, a filling chamber communicating with the valve chamber and with said first mentioned chamber, a valve controlling communication between the latter chambers and having a passage therethrough communicating with the atmosphere, and a bleeder valve controlling the passage through said last named valve.

2. A control valve for a hydraulic brake system having a source of fluid under pressure, a pressure producing device, a reservoir and a fluid pressure operated brake actuator, said control valve comprising a valve chamber having spaced passages respectively connected to the pressure producing device and brake actuator, first and second chambers spaced from each other longitudinally of the valve chamber between said passages and respectively connected to the source of fluid under pressure and the fluid reservoir, a valve member slidably supported in the valve chamber between said passages and movable in opposite directions to alternately connect the brake actuator to the source of fluid under pressure and to the reservoir, a filling chamber communicating with the passage connected to the pressure producing device, a fluid connection between the filling chamber and the first mentioned chamber, a valve controlling said fluid connection and having a passage adapted to communicate with the atmosphere, and means normally closing the passage through the last named valve including a second independently operable valve.

3. A control valve for a hydraulic brake system having a source of fluid under pressure, a pressure producing device, a reservoir and a fluid pressure operated brake actuator, said control valve comprising a valve chamber having spaced passages respectively connected to the pressure producing device and brake actuator, first and second chambers spaced from each other longitudinally of the valve chamber between said passages and respectively connected to the source of fluid under pressure and the fluid reservoir, a valve member slidably supported in the valve chamber between said passages and movable in opposite directions to alternately connect the brake actuator to the source of fluid under pressure and to the reservoir, a fluid connection between the first chamber and the valve chamber beyond one end of said valve member to bypass fluid under pressure from the source of supply to the valve chamber, a second valve normally closing the fluid connection and having a passage therethrough, and a third valve carried by the second valve and operable independently of the latter to control the passage therethrough.

4. A control valve for a hydraulic brake system having a source of fluid under pressure, a pressure producing device, a reservoir and a fluid pressure operated brake actuator, said control valve comprising a valve chamber having spaced passages respectively connected to the pressure producing device and brake actuator, first and second chambers spaced from each other longitudinally of the valve chamber between said passages and respectively connected to the source of fluid under pressure and the fluid reservoir, a valve member slidably supported in the valve chamber between said passages and movable in opposite directions to alternately connect the brake actuator to the source of fluid under pressure and to the reservoir, a fluid connection between the first chamber and the passage connected to the pressure producing device for bypassing fluid under pressure from the source of supply to the latter passage, a second valve in said fluid connection normally closing communication between the first chamber and the passage connected to the pressure producing device, said second valve having a passage therethrough adapted to communicate with the atmosphere, and a bleeder valve operable independently of the second valve to control the passage therethrough.

5. A control valve for a hydraulic brake system having a source of fluid under pressure, a pressure producing device, a reservoir and a fluid pressure operated brake actuator, said control valve comprising a valve chamber having spaced passages respectively connected to the pressure producing device and brake actuator, first and second chambers spaced from each other longitudinally of the valve chamber between said passages and respectively connected to the source of fluid under pressure and the fluid reservoir, a valve member slidably supported in the valve chamber between said passages and movable in opposite directions to alternately connect the brake actuator to the source of fluid under pressure and to the reservoir, a fluid connection between the first chamber and the valve chamber beyond one end of the valve member, said fluid connection including a filling chamber having an apertured valve seat, a second valve member threaded in the filling chamber and having the inner end engageable with the seat, means on the second valve member projecting exteriorly of the control valve to enable manipulation of the second valve member, said second valve member having a recess at the outer end provided with a valve seat connected to the first named valve seat by a passage through the second valve member, and means for controlling the flow of fluid through the passage in the second valve member including a bleeder valve threaded in the recess in the second valve member and having one end portion engageable with the valve seat in said recess.

6. A control valve for a hydraulic brake system having a source of fluid under pressure, a pressure producing device, a reservoir and a fluid pressure operated brake actuator, said control valve comprising a valve chamber having spaced passages respectively connected to the pressure producing device and brake actuator, first and second chambers spaced from each other longitudinally of the valve chamber between said passages and respectively connected to the source of fluid under pressure and the fluid reservoir, a valve member slidably supported in the valve chamber between said passages and movable in opposite directions to alternately connect the brake actuator to the source of fluid under pressure and to the reservoir, a fluid connection between the first chamber and the passage connected to the pressure producing device for bypassing fluid under pressure from the source of supply to the passage connected to the pressure producing device, means in said fluid connection for retarding the rate of flow of fluid under pressure through the bypass to an extent predetermined to maintain said rate below that required for operation of the valve member, a second valve member in the bypass normally closing the latter and having a passage therethrough adapted to communicate with the atmosphere, and a bleeder valve for controlling the passage through said second valve member.

7. A control valve for a hydraulic brake system having a source of fluid under pressure, a pressure producing device, a reservoir and a fluid pressure operated brake actuator, said control valve comprising a valve chamber having spaced ports respectively connected to the pressure producing device and brake actuator, first and second chambers spaced from each other longitudinally of the valve chamber between said ports and respectively connected to the source of fluid under pressure and the fluid reservoir, a valve member slidably supported in the valve chamber between said ports and movable in opposite directions to alternately connect the brake actuator to the source of fluid under pressure and to the reservoir, a filling chamber communicating with the valve chamber, a filter in said filling chamber, a first passage extending outwardly from the first named chamber and having a valve seat at the inner end apertured to communicate with said first chamber, a second passage extending from the first passage at the outer side of the valve seat to the filling chamber at the inner side of the filter, a third passage connecting the portion of the filling chamber at the outer side of the filter to the first passage, a second valve member in the first passage having the inner end engageable with the valve seat and movable off said valve seat to connect the first named chamber with the second mentioned passage, a passage in the second valve member connected to the third mentioned passage, and a bleeder valve controlling the flow through the passage in the second valve member.

ROBERT E. TAMM.
EDWARD R. MARTENS.

REFERENCES CITED

The following references are of record in the file of this patent:

UNITED STATES PATENTS

| Number | Name | Date |
|---|---|---|
| 1,962,857 | Cash | June 12, 1934 |
| 2,289,043 | Rockwell | July 7, 1942 |
| 2,306,346 | Rockwell | Dec. 22, 1942 |